United States Patent
Nishioka et al.

(10) Patent No.: US 11,979,255 B2
(45) Date of Patent: May 7, 2024

(54) COMMUNICATION SYSTEM AND COMMUNICATION METHOD

(71) Applicant: Nippon Telegraph and Telephone Corporation, Tokyo (JP)

(72) Inventors: Takeaki Nishioka, Tokyo (JP); Hiroshi Osawa, Tokyo (JP); Satomi Inoue, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 366 days.

(21) Appl. No.: 17/427,855

(22) PCT Filed: Jan. 22, 2020

(86) PCT No.: PCT/JP2020/002140
§ 371 (c)(1),
(2) Date: Aug. 2, 2021

(87) PCT Pub. No.: WO2020/162180
PCT Pub. Date: Aug. 13, 2020

(65) Prior Publication Data
US 2022/0131722 A1    Apr. 28, 2022

(30) Foreign Application Priority Data
Feb. 6, 2019 (JP) .................. 2019-020122

(51) Int. Cl.
*H04L 12/46* (2006.01)
*H04L 45/50* (2022.01)
(52) U.S. Cl.
CPC .......... *H04L 12/4641* (2013.01); *H04L 45/50* (2013.01)

(58) Field of Classification Search
CPC ........................... H04L 12/4641; H04L 45/50
USPC ......................................................... 370/254
See application file for complete search history.

(56) References Cited

U.S. PATENT DOCUMENTS

| | | | |
|---|---|---|---|
| 9,961,624 B1 | 5/2018 | Zait | |
| 10,057,162 B1 * | 8/2018 | Singh | ...................... H04L 45/66 |
| 2016/0308762 A1 * | 10/2016 | Teng | ................... H04L 12/4633 |
| 2018/0013821 A1 * | 1/2018 | Bosch | ................. H04L 45/0377 |

OTHER PUBLICATIONS

Nakamura et al., "Practical Service Chaining Based on IP Routing," Asian Internet Engineering Conference (AINTEC), Nov. 12, 2018, retrieved from URL <https://dl.acm.org/citation.cfm?id=3289170>, pp. 24-31.

Nakamura et al., "Service Chaining Based on IP Routing Techniques in ShowNet 2018," IEICE Technical Report, 2018, 118(204):91-96, 13 pages (With English Translation).

Nippon Telegraph and Telephone Corporation, "About Service Chaining Demonstration of the World's First Interconnection of 6 Companies Using the New IETF Method," Feb. 12, 2015, retrieved from URL <http://www.ntt.co.jp/news2015/1502/150212a.html>, 8 pages (With English Translation).

* cited by examiner

*Primary Examiner* — Faisal Choudhury
(74) *Attorney, Agent, or Firm* — Fish & Richardson P.C.

(57) ABSTRACT when packets are received via any one of the plurality of inflow VRFs provided for respective route patterns, a chaining edge router (10) redirects the packets to a chain VRF corresponding to the inflow VRF. The chaining edge router (10) transfers the packets redirected to the chain VRF to respective functions via a communication path constructed using a VLAN in advance according to a route pattern corresponding to the chain VRF.

3 Claims, 6 Drawing Sheets

Fig. 3

| INFLOW VRF | REDIRECT DESTINATION VRF |
|---|---|
| In-VRF-A | ChainVRF1-1 |
| In-VRF-B | ChainVRF2-1 |
| ⋮ | ⋮ |

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2020/002140, having an International Filing Date of Jan. 22, 2020, which claims priority to Japanese Application Serial No. 2019-020122, filed on Feb. 6, 2019. The disclosure of the prior application is considered part of the disclosure of this application, and is incorporated in its entirety into this application.

TECHNICAL FIELD

The present invention relates to a communication system and a communication method.

BACKGROUND ART

In recent years, a service chaining technology that controls routes for respective types of traffic on a network so as to pass through an arbitrary service function is known. An architecture called Service Function Chaining for realizing such service chaining and a method called NSH (Network Service Header) that realizes the service chaining by allocating a unique header to a packet are known. Moreover, a method called Flow chain is known as a service chaining method which uses existing IP routing without using a unique header.

CITATION LIST

Non Patent Literature

[NPL 1] "Practical Service Chaining based on IP Routing", [online], [Retrieved on Jan. 30, 2019], Internet <https://dl.acm.org/citation.cfm?id=3289170>

[NPL 2] "World's first demonstration of interoperability of new IETF method for service chaining involving six companies", [online], [Retrieved on Jan. 30, 2019], Internet <http://www.ntt.co.jp/news2015/1502/150212a.html>

SUMMARY OF THE INVENTION

Technical Problem

However, in the conventional technology, since a route advertisement to all virtual routing and forwarding(s) (VRFs) passing due to an inflow traffic change is required, the scalability is limited. For example, since the Flow chain method requires a route advertisement to all VRFs passing due to an inflow traffic change, the scalability is limited. On the other hand, for example, since the conventional NSH allocates a unique header to a packet, this method cannot be used unless a transfer device supports the method. Since the NSH method allocates a unique header to a packet, this method cannot be used unless a transfer device supports this method.

Means for Solving the Problem

In order to solve the problems and attain the object, a communication system of the present invention includes: a redirect unit that redirects packets to a chain VRF corresponding to an inflow VRF when the packets are received via any one of a plurality of inflow VRFs provided for respective route patterns; and a transferring unit that transfers the packets redirected to the chain VRF by the redirect unit to a function via a communication path constructed using a virtual local area network (VLAN) in advance according to a route pattern corresponding to the chain VRF.

A communication method of the present invention is a communication method executed by a communication system, including: a redirect step of redirecting packets to a chain VRF corresponding to an inflow VRF when the packets are received via any one of a plurality of inflow VRFs provided for respective route patterns; and a transferring step of transferring the packets redirected to the chain VRF by the redirect unit to a function via a communication path constructed using a VLAN in advance according to a route pattern corresponding to the chain VRF.

Effects of the Invention

According to the present invention, it is possible to reduce the number of route advertisements by preparing a route pattern in advance distributing routes during inflow only.

BRIEF DESCRIPTION OF DRAWINGS

FIG. 3 is a diagram illustrating an example of information stored in a setting information storage unit.

DESCRIPTION OF EMBODIMENTS

Hereinafter, an embodiment of a communication system and a communication method according to the present application will be described in detail with reference to the drawings. The communication system and the communication method according to the present application are not limited to this embodiment.

First Embodiment

In the following embodiment, a configuration of a communication system according to the first embodiment and the flow of processing of the communication system will be described in order, and finally, the effects of the first embodiment will be described.

[Configuration of Communication System]

Figure 1:
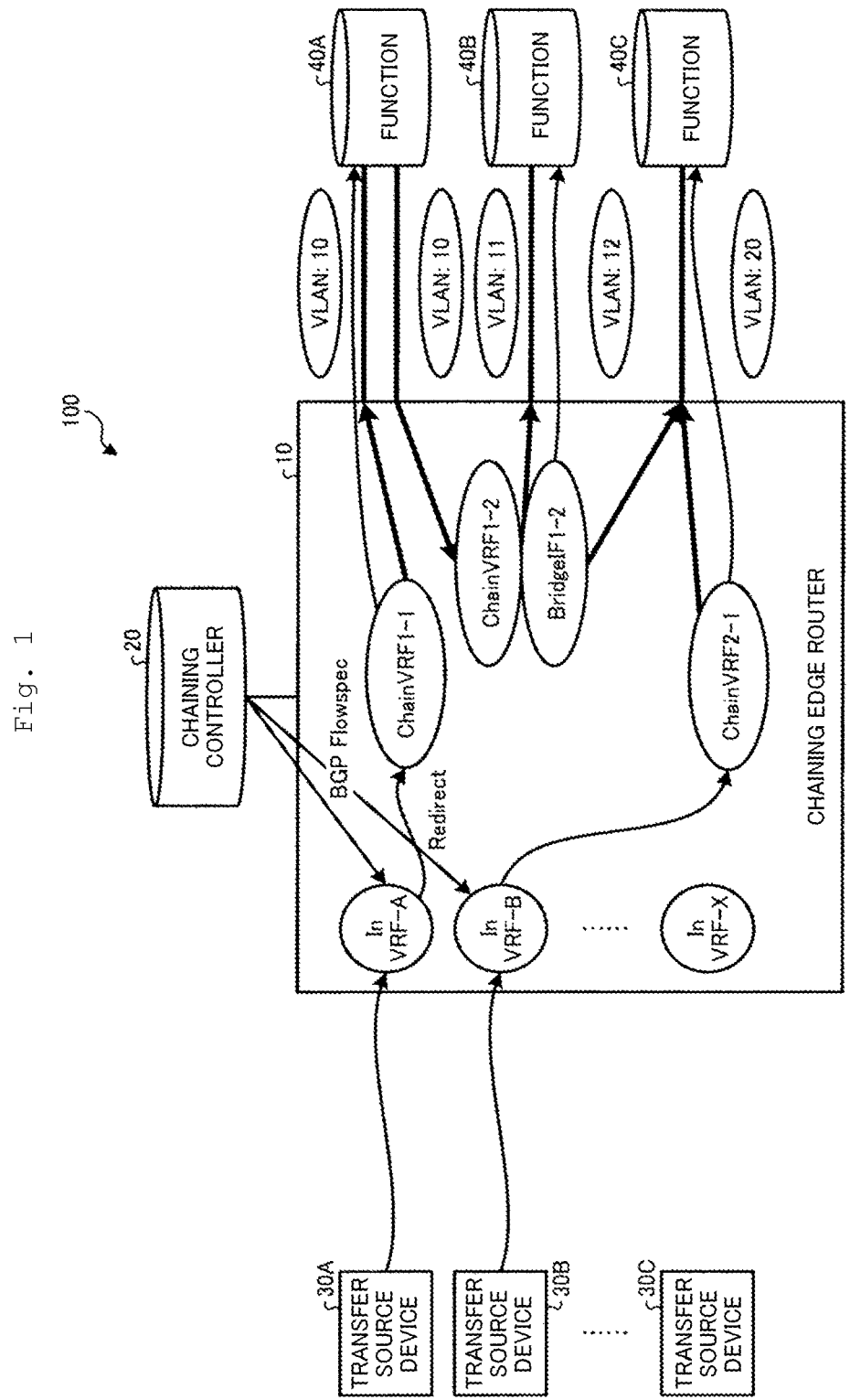
FIG. 1 is a diagram illustrating an example of a configuration of a communication system according to a first embodiment.

First, an overview of a communication system 100 according to the first embodiment will be described with reference to FIG. 1. FIG. 1 is a diagram illustrating an example of a configuration of a communication system according to the first embodiment. The communication system 100 according to the first embodiment includes a chaining edge router 10, a chaining controller 20, a plurality of transfer source devices 30A to 30C, and a plurality of functions 40A to 40C. The configuration illustrated in FIG. 1 is an example only, and a specific configuration and the number of devices are not particularly limited. Moreover, the plurality of transfer source devices 30A to 30C and the plurality of functions 40A to 40C will be described as a transfer source device 30 and a function 40 when they are not particularly distinguished.

The communication system 100 according to the first embodiment controls routes for respective types of traffic so as to pass through an arbitrary service function. In the chaining edge router 10, a number of inflow VRFs (In VRFs) corresponding to the number of traffic patterns to be distinguished are created, and control target traffics flow into mutually different In VRFs, respectively.

In the chaining edge router 10, routes are constructed in advance using a number of VRFs, VLANs in advance, and bridge interfaces corresponding to the number of traffic patterns to be distinguished. These VRFs are referred to as "Chain VRF".

In the chaining edge router 10, traffic transfer to a plurality of ports is realized using broadcast on a bridge interface (BridgeIF) when replicating traffic in the middle of a route.

The chaining controller 20 controls the chaining edge router 10 by instructing the chaining edge router 10 to set an inflow traffic route. For example, the chaining controller 20 controls a route to which inflow traffic will be transferred by designating a redirect destination chain VRF of each In VRF using border gateway protocol (BGP) Flowspec.

The transfer source devices 30A to 30C are devices that each transfer packets to the chaining edge router 10. The functions 40A to 40C are devices that execute network processing on packets using a network service function. The VRF of the chaining edge router 10 and the functions 40A to 40C each construct a Layer 2 (L2) communication path using a VLAN. That is, the communication system 100 constructs an L2 route in advance using a VRF and a VLAN to realize a route that does not depend on an L3 header.

In the example of FIG. 1, the transfer source device 30A transfers packets to In VRF-A and the transfer source device 30B transfers packets to In VRF-B. Here, a route pattern prepared in advance will be described using the example of FIG. 1.

As illustrated in FIG. 1, the chaining edge router 10 redirects packets to Chain VRF 1-1 upon receiving packets via In VRF-A. After that, the chaining edge router 10 transfers packets from Chain VRF 1-1 to the function 40A via VLAN:10. The chaining edge router 10 receives the packets processed by the function 40A via Chain VRF 1-2 and notifies the packets from Chain VRF 1-2 to BridgeIF 1-2. Subsequently, the chaining edge router 10 replicates the packets and transfers the packets to the functions 40B and 40C using L2 broadcast on BridgeIF 1-2.

When packets are received via In VRF-B, the chaining edge router 10 redirects the packets to Chain VRF 2-1 and transfers the packets from Chain VRF 2-1 to the function 40C via VLAN:20 according to a route pattern.

As described above, in the communication system 100 according to the first embodiment, it is possible to reduce the number of route advertisements by preparing a route pattern in advance and distributing routes during inflow only. In the chaining edge router 10, since an intermediate route is set to an L2 level, even when IP information after passing through a function overlaps in individual traffics, the IP information can be identified for respective original traffics.

[Configuration of Chaining Edge Router]

Figure 2:
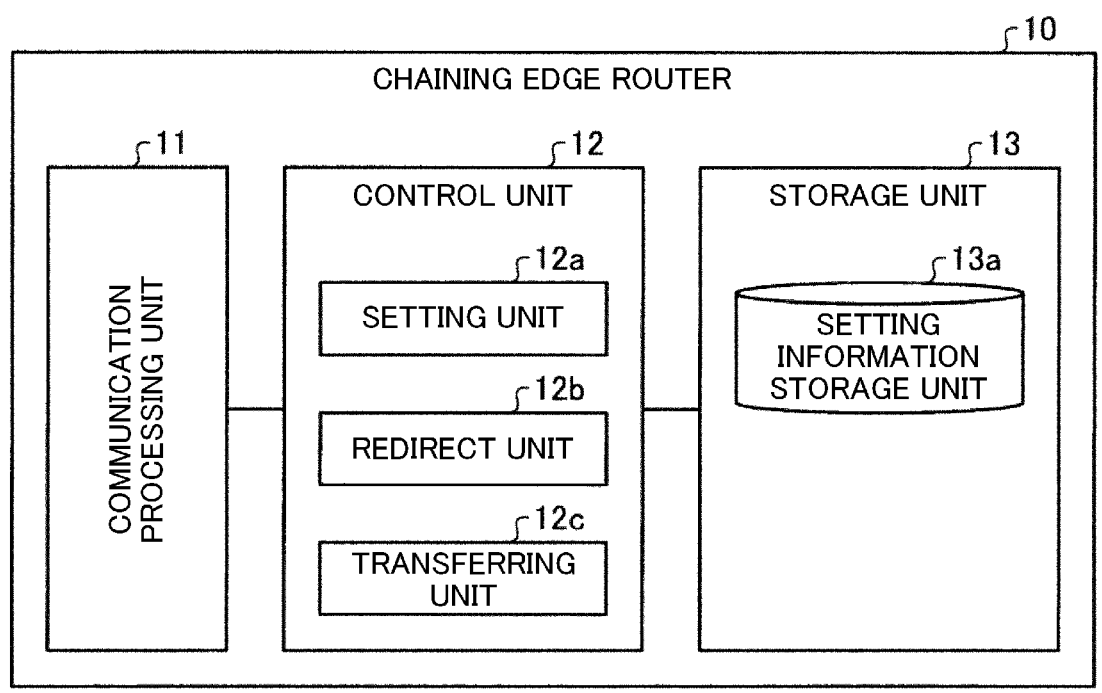
FIG. 2 is a diagram illustrating an example of a configuration of a chaining edge router according to the first embodiment.

Next, the configuration of the chaining edge router 10 will be described with reference to FIG. 2. FIG. 2 is a diagram illustrating an example of the configuration of the chaining edge router according to the first embodiment. As illustrated in FIG. 2, the chaining edge router 10 includes a communication processing unit 11, a control unit 12, and a storage unit 13. Processing of each unit of the chaining edge router 10 will be described below.

The communication processing unit 11 controls communication of various pieces of information. For example, the communication processing unit 11 receives setting instructions from the chaining controller 20 and transmits and receives packets between the transfer source device 30 and the function 40.

The storage unit 13 stores programs and data necessary for various kinds of processing of the control unit 12. The storage unit 13 includes a setting information storage unit 13a. For example, the storage unit 13 is a semiconductor memory device such as a RAM (Random Access Memory) or a flash memory, or a storage device such as a hard disk or an optical disc.

The setting information storage unit 13a stores redirect destination VRFs in correlation with inflow VRFs. For example, as illustrated in FIG. 3, the setting information storage unit 13a stores "inflow VRF" indicating information for uniquely identifying In VRF and "redirect destination VRF" indicating information for uniquely identifying redirect destination VRFs.

To describe with specific example of FIG. 3, the setting information storage unit 13a stores an inflow VRF "In VRF-A" and a redirect destination VRF "Chain VRF 1-1" in correlation. This means that, when the chaining edge router 10 receives packets via In VRF-A, the chaining edge router 10 redirects the packets to Chain VRF 1-1. Moreover, the information stored in the setting information storage unit 13a is information registered by the chaining controller 20 and is added, changed, and deleted according to an instruction of the chaining controller 20.

The control unit 12 includes internal memories for storing necessary data and programs defining various processing procedures and the like and executes various kinds of processing with the aid of these memories. The control unit 12 includes a setting unit 12a, a redirect unit 12b, and a transferring unit 12c. Here, for example, the control unit 12 is an electronic circuit such as a CPU (Central Processing Unit) or an MPU (Micro Processing Unit) and an integrated circuit such as an ASIC (Application Specific Integrated Circuit) or an FPGA (Field Programmable Gate Array).

The setting unit 12a sets redirect destination chain VRFs of inflow VRFs using BGP Flowspec. Specifically, the setting unit 12a receives designation of a redirect destination VRF by BGP Flowspec from the chaining controller 20 and stores information on the designated redirect destination VRF in the setting information storage unit 13a. To describe with a specific example, when "Chain VRF 1-1" is designated as a redirect destination VRF for the inflow VRF "In VRF-A" from the chaining controller 20, the setting unit 12a stores the inflow VRF "In VRF-A" and the redirect destination VRF "Chain VRF 1-1" in the setting information storage unit 13a in correlation.

When packets are received via any one of the plurality of inflow VRFs provided for respective route patterns, the redirect unit 12b redirects the packets to a chain VRF corresponding to the inflow VRF. Specifically, when packets are received via the inflow VRF, the redirect unit 12b redirects the packets to a chain VRF set as a redirect destination of the inflow VRF by the setting unit 12a.

For example, when packets are received via the inflow VRF "In VRF-A", the redirect unit 12b redirects the packets to "Chain VRF 1-1" which is a redirect destination VRF corresponding to the inflow VRF "In VRF-A" by referring to the setting information storage unit 13a.

The transferring unit 12c transfers the packets redirected to the chain VRF to respective functions 40 via a communication path constructed using a VLAN in advance according to a route pattern corresponding to the chain VRF.

The transferring unit 12c replicates the packets and transfers the replicated packets to mutually different functions 40 by L2 broadcast via the communication path constructed in the L2 level. For example, the transferring unit 12c replicates the packets and transfers the packets in parallel to a plurality of functions using L2 broadcast on BridgeIF.

[Processing Flow of Communication System]

Figure 4:
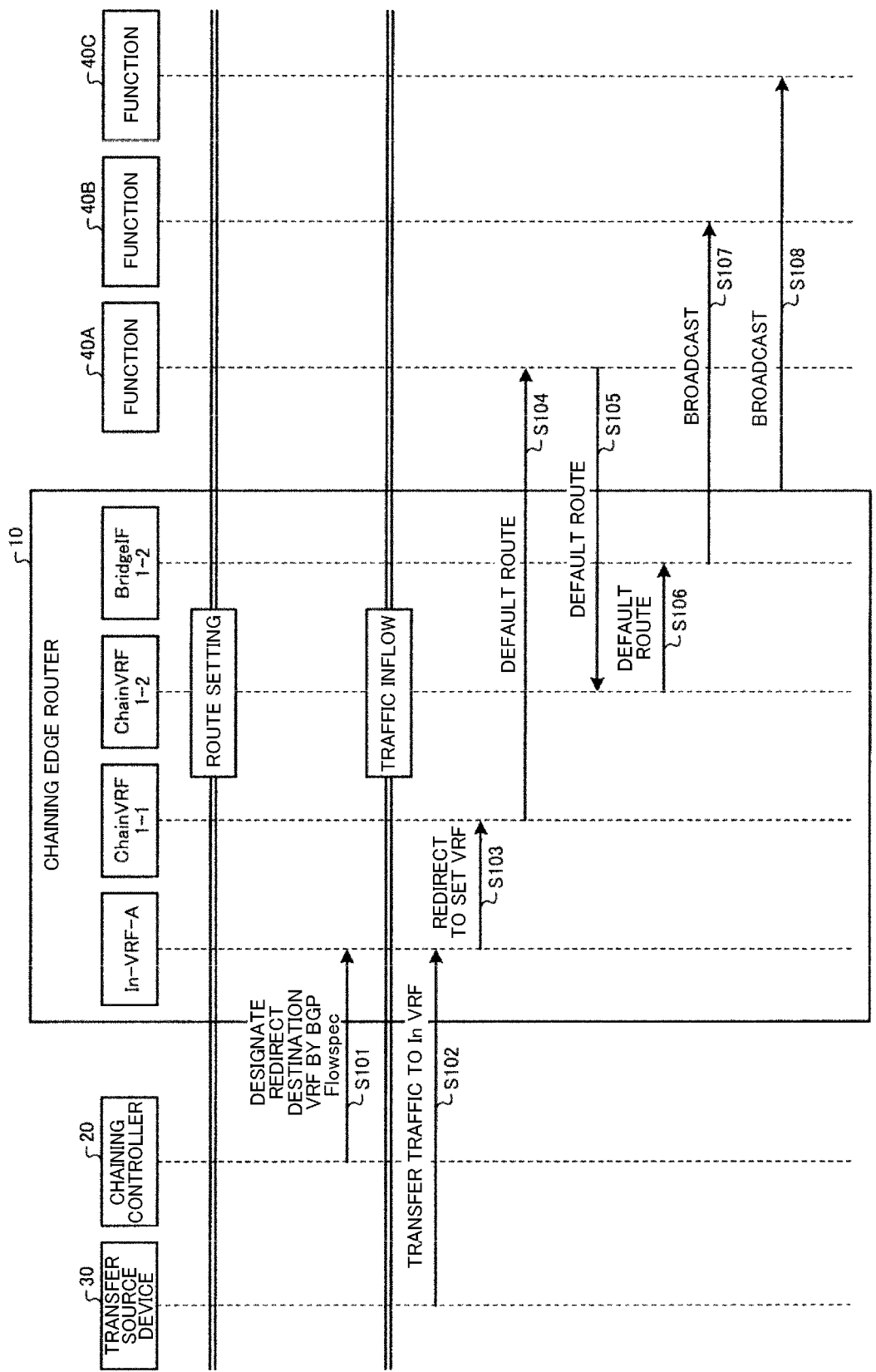
FIG. 4 is a sequence diagram illustrating an example of processing of a communication system according to the first embodiment.

Next, the flow of processing of the communication system 100 according to the first embodiment will be described with reference to FIG. 4. FIG. 4 is a sequence diagram illustrating an example of the processing of the communication system according to the first embodiment. In the example of FIG. 4, the processing during route setting performed in advance and the processing during inflow of traffic will be described.

As illustrated in FIG. 4, the chaining controller 20 designates a redirect destination VRF of BGP Flowspec with respect to the chaining edge router 10 as the processing during route setting (step S101). In the example of FIG. 4, the chaining controller 20 designates "Chain VRF 1-1" as a redirect destination VRF of the inflow VRF "In VRF-A".

When the transfer source device 30 transfers traffic to the inflow VRF "In VRF-A" (step S102), In VRF-A redirects packets to the set Chain VRF 1-1 (step S103).

The chaining edge router 10 transfers the packets from Chain VRF 1-1 to the function 40A as a default route (step S104). The chaining edge router 10 receives the packets processed by the function 40A via Chain VRF 1-2 (step S105) and notifies the packets from Chain VRF 1-2 to BridgeIF 1-2 (step S106).

Subsequently, the chaining edge router 10 replicates the packets and transfers the packets to the functions 40B and 40C using L2 broadcast on BridgeIF 1-2 (steps S107 and S108).

Effects of First Embodiment

As described above, in the communication system 100 according to the first embodiment, when packets are received via any one of the plurality of inflow VRFs provided for respective route patterns, the chaining edge router 10 redirects the packets to a chain VRF corresponding to the inflow VRF. The chaining edge router 10 transfers the packets redirected to the chain VRF to respective functions via a communication path constructed using a VLAN in advance according to a route pattern corresponding to the chain VRF.

Therefore, in the communication system 100 according to the first embodiment, it is possible to reduce the number of route advertisements by preparing a route pattern in advance distributing routes during inflow only.

In the communication system 100 according to the first embodiment, it is possible to replicate the traffic in the middle of transfer, branch the route, and transfer the traffic to a plurality of functions in parallel. Furthermore, in the communication system 100, since an intermediate route is set to an L2 level, even when IP information after passing through a function overlaps in individual traffics, the IP information can be identified for respective original traffics.

Figure 5:
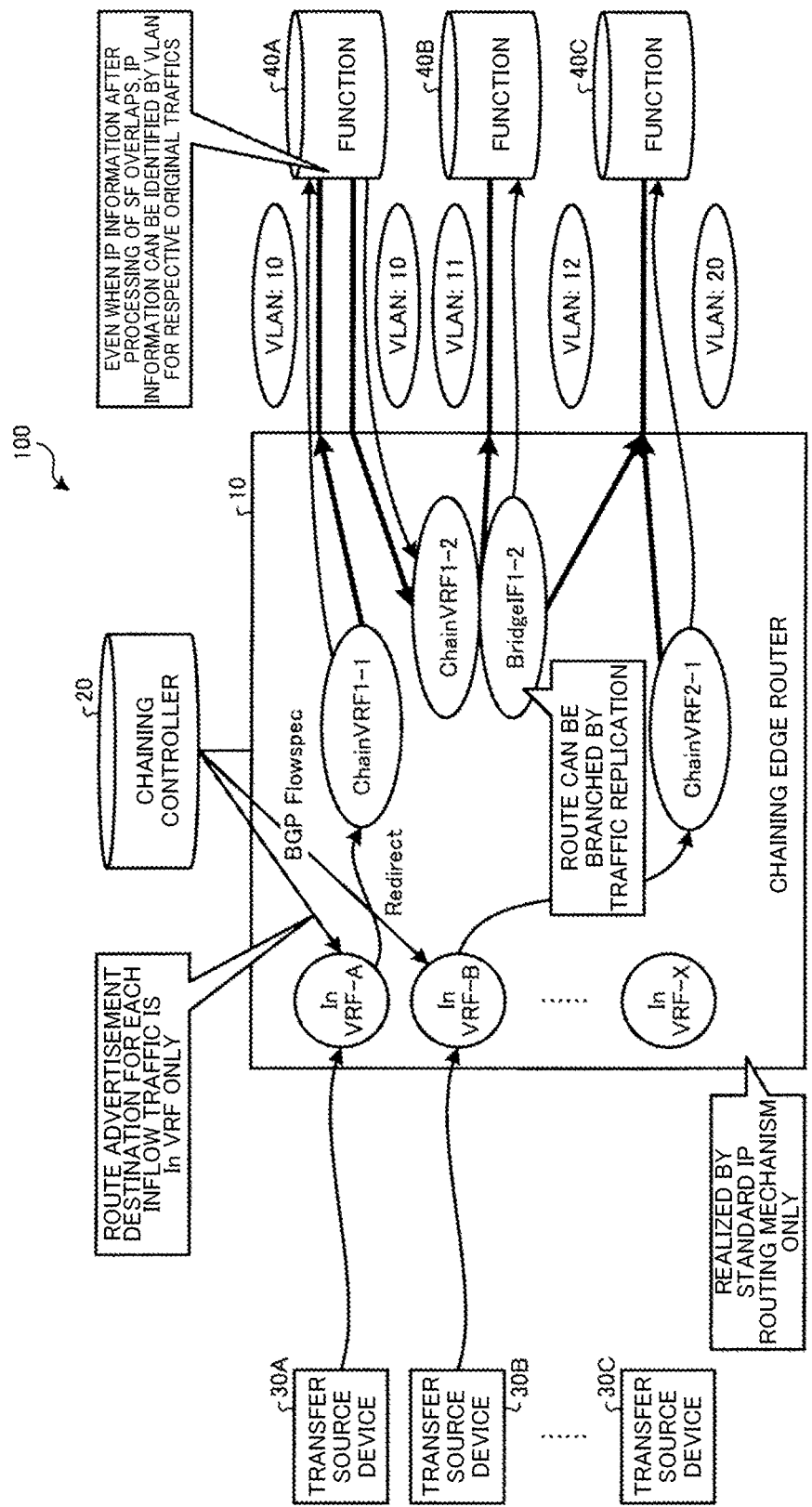
FIG. 5 is a diagram illustrating the effects of the communication system according to the first embodiment.

Here, the effects of the communication system 100 according to the first embodiment will be described with reference to FIG. 5. FIG. 5 is a diagram illustrating the effects of the communication system according to the first embodiment. As illustrated in FIG. 5, the communication system 100 according to the first embodiment can be realized by the standard IP Routing mechanism only. That is, the communication system 100 can control the route of traffic without allocating a unique header to a packet unlike the conventional NSH method.

As illustrated in FIG. 5, in the communication system 100, the route advertisement destination of each inflow traffic is the In VRF only, and the number of route advertisements can be reduced as compared to the conventional Flow chain method. Moreover, in the communication system 100, even when IP information after the processing of a function (SF: Service Function) overlaps, it is possible to identify a VLAN for respective original traffics.

[System Configuration and the Like]

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processing described as automatically performed processing out of the processing described in the present embodiment may be performed manually. Alternatively, all or part of the processing described as manually performed processing may be performed automatically by a known method. In addition, the processing procedures, the control procedures, the specific names, and the information including various kinds of data and parameters described in the present specification and the drawings can be optionally changed unless there is any special mention.

[Program]

A program that describes the processing executed by each device described in the embodiment in a language executable by a computer may be created. For example, a discrimination program that describes the processing executed by the communication system according to the embodiment in a language executable by a computer may be created. In this case, the computer executes the program whereby the same effects as those of the embodiment can be obtained. An example of the computer that executes the program will be described below.

Figure 6:
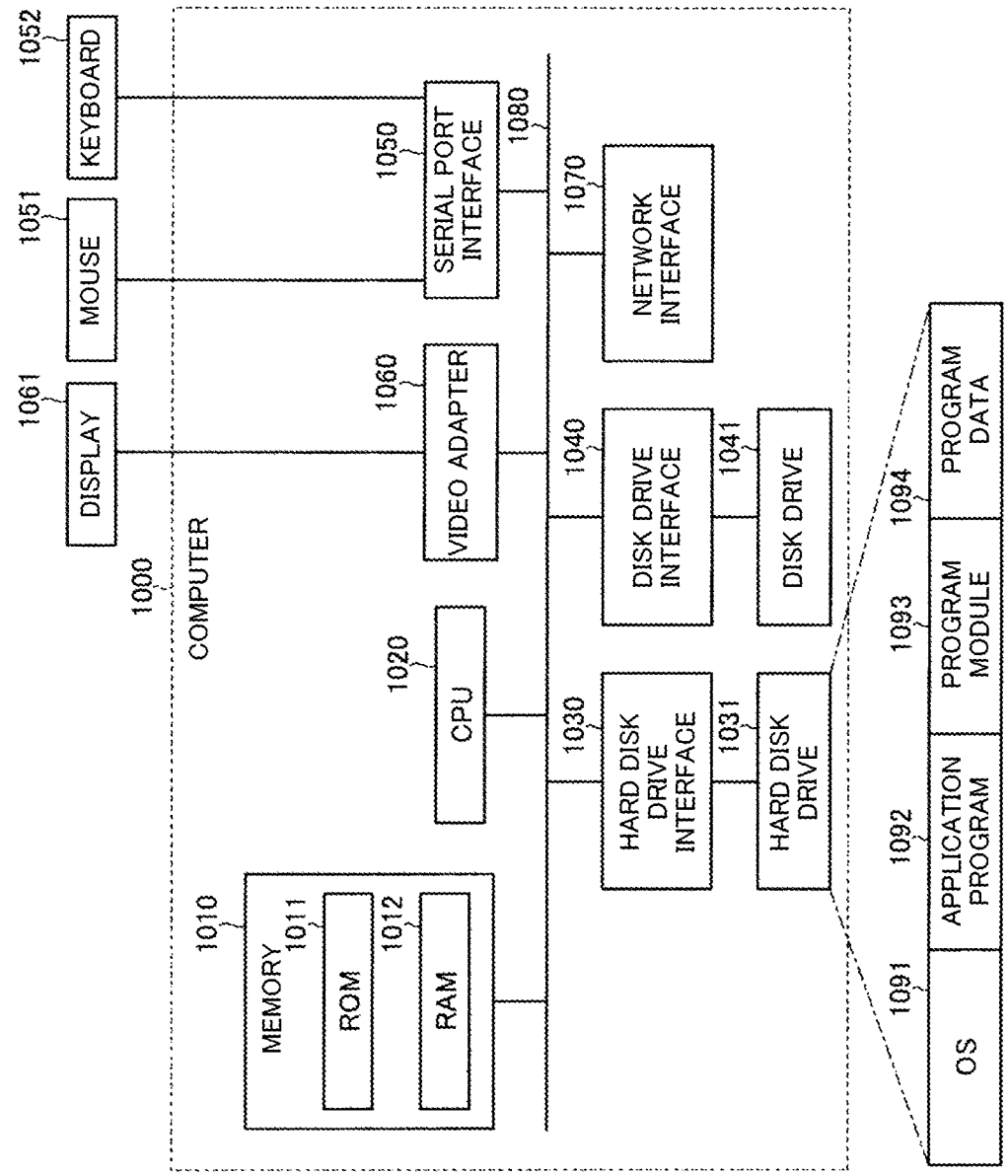
FIG. 6 is a diagram illustrating a computer that executes a program.

FIG. 6 is a diagram of an example of a computer serving as the log analysis device by executing the program. A computer 1000 includes a memory 1010 and a CPU 1020. The computer 1000 also includes a hard disk drive interface 1030, a disk drive interface 1040, a serial port interface 1050, a video adapter 1060, and a network interface 1070, for example. These components are connected via a bus 1080.

The memory 1010 includes a ROM (read only memory) 1011 and a RAM 1012. The ROM 1011 stores therein a boot program, such as a BIOS (basic input/output system). The hard disk drive interface 1030 is connected to a hard disk drive 1090. The disk drive interface 1040 is connected to a disk drive 1100. Removable storage media, such as magnetic disks and optical discs, are inserted into the disk drive 1100. The serial port interface 1050 is connected to a mouse 1051 and a keyboard 1052, for example. The video adapter 1060 is connected to a display 1061, for example.

The hard disk drive 1090 stores therein an OS 1091, an application program 1092, a program module 1093, and program data 1094, for example. In other words, the program defining the various kinds of processing performed by the respective devices is provided as the program module 1093 describing computer-executable codes. The program module 1093 is stored in the hard disk drive 1090, for example. For example, the program module 1093 for executing the same processing as that performed by the functional configuration in the device is stored in the hard disk drive 1090. Instead of the hard disk drive 1090, an SSD (Solid State Drive) may be provided.

The data used for the processing according to the embodiment is stored in the memory 1010 or the hard disk drive 1090 as the program data 1094, for example. The CPU 1020 reads the program module 1093 and the program data 1094 stored in the memory 1010 or the hard disk drive 1090 into the RAM 1012 as needed and executes various processing procedures.

The program module 1093 and the program data 1094 are not necessarily stored in the hard disk drive 1090. The program module 1093 and the program data 1094 may be stored in a removable storage medium and read by the CPU 1020 via the disk drive 1100, for example. Alternatively, the program module 1093 and the program data 1094 may be stored in another computer connected via a network (for example, a WAN). In this case, the program module 1093 and the program data 1094 may be read from the other computer by the CPU 1020 via the network interface 1070.

REFERENCE SIGNS LIST

10 Chaining edge router
11 Communication processing unit
12 Control unit
12a Setting unit
12b Redirect unit
12c Transferring unit
13 Storage unit
13a Setting information storage unit
20 Chaining controller
30A to 30C Transfer source device
40A to 40C Function
100 Communication system

The invention claimed is:

1. A communication system comprising a processor and a storage device storing computer-executable instructions that when executed by the processor, cause the processor to perform operations comprising:
    for each inflow virtual routing and forwarding (VRF) in a plurality of inflow VRFs, setting, using border gateway protocol (BGP) Flowspec, a respective one of a plurality of destination chain VRFs for the respective inflow VRF;
    storing as route patterns, for each inflow VRF in the plurality of VRFs, a respective correspondence between the respective inflow VRF and the respective destination chain VRFs that has been set using the BGP Flowspec for the respective inflow VRF;
    in response to receiving packets via any one of the plurality of inflow VRFs, redirecting the packets to a corresponding destination chain VRF specified by the route patterns; and
    transferring the packets redirected to the corresponding destination chain VRF to a function via a communication path constructed using a virtual local area network (VLAN) in advance according to a route pattern corresponding to the chain VRF.

2. The communication system according to claim 1, wherein the operations further comprise:
    redirecting packets and transferring the replicated packets to mutually different functions by Layer 2 (L2) broadcast via a communication path constructed in an L2 level.

3. A communication method executed by a communication system, comprising:
    for each inflow virtual routing and forwarding (VRF) in a plurality of inflow VRFs, setting, using border gateway protocol (BGP) Flowspec, a respective one of a plurality of destination chain VRFs for the respective inflow VRF;
    storing as route patterns, for each inflow VRF in the plurality of VRFs, a respective correspondence between the respective inflow VRF and the respective destination chain VRFs that has been set using the BGP Flowspec for the respective inflow VRF;
    in response to receiving packets via any one of the plurality of inflow VRFs, redirecting the packets to a corresponding destination chain VRF specified by the route patterns; and
    transferring the packets redirected to the corresponding destination chain VRF to a function via a communication path constructed using a virtual local area network (VLAN) in advance according to a route pattern corresponding to the chain VRF.

* * * * *